US006993654B2

(12) United States Patent
Seki et al.

(10) Patent No.: US 6,993,654 B2
(45) Date of Patent: Jan. 31, 2006

(54) SECURE ENCRYPTION PROCESSOR WITH TAMPER PROTECTION

(75) Inventors: Yuji Seki, Kawasaki (JP); Yusuke Kawasaki, Kawasaki (JP); Shigeru Hashimoto, Kawasaki (JP); Ryoichi Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 781 days.

(21) Appl. No.: 09/733,912

(22) Filed: Dec. 12, 2000

(65) Prior Publication Data

US 2002/0016914 A1 Feb. 7, 2002

(30) Foreign Application Priority Data

Jun. 29, 2000 (JP) ....................................... 2000-196040

(51) Int. Cl.
*H04L 9/00* (2006.01)
*H04L 9/32* (2006.01)
*G06F 11/30* (2006.01)
*G06F 12/14* (2006.01)

(52) U.S. Cl. ........................... 713/172; 713/194; 380/44
(58) Field of Classification Search ................. 713/153, 713/172, 194, 201; 380/44, 228, 30
See application file for complete search history.

(56) References Cited

U.S. PATENT DOCUMENTS

| 4,700,055 | A | * | 10/1987 | Kashkashian, Jr. .......... 235/379 |
| 5,027,397 | A | * | 6/1991 | Double et al. .............. 713/194 |
| 5,048,085 | A | * | 9/1991 | Abraham et al. ........... 713/159 |
| 5,111,504 | A | * | 5/1992 | Esserman et al. ........... 380/281 |
| 5,134,700 | A | * | 7/1992 | Eyer et al. .................. 711/164 |
| 5,142,578 | A | * | 8/1992 | Matyas et al. .............. 380/280 |
| 5,148,481 | A | * | 9/1992 | Abraham et al. ............. 380/46 |
| 5,159,629 | A | * | 10/1992 | Double et al. .............. 713/194 |
| 5,301,231 | A | * | 4/1994 | Abraham et al. ........... 713/191 |
| 5,721,781 | A | | 2/1998 | Deo et al. .................... 380/25 |
| 5,737,419 | A | * | 4/1998 | Ganesan ..................... 713/169 |
| 5,742,756 | A | * | 4/1998 | Dillaway et al. ........... 713/200 |
| 5,768,389 | A | * | 6/1998 | Ishii ............................ 380/30 |
| 5,778,071 | A | | 7/1998 | Caputo et al. ................ 380/25 |
| 5,794,207 | A | * | 8/1998 | Walker et al. ................. 705/1 |
| 5,832,207 | A | | 11/1998 | Little et al. ................. 395/186 |
| 6,378,072 | B1 | * | 4/2002 | Collins et al. .............. 713/187 |
| 6,643,781 | B1 | * | 11/2003 | Merriam ..................... 713/201 |

FOREIGN PATENT DOCUMENTS

| EP | 0 876 026 | 4/1998 |
| JP | A-8-190509 | 7/1996 |
| JP | A-11-175334 | 7/1999 |
| WO | WO 99/39475 | 8/1999 |
| WO | WO 99/61989 | 12/1999 |

OTHER PUBLICATIONS

Microsoft Press "Microsoft Computer Dictionary Third Edition" Microsoft Corporation 1997 p. 428.*
Search Report for corresponding French Application (0016904000) dated Aug. 27, 2004.

* cited by examiner

*Primary Examiner*—Ayaz Sheikh
*Assistant Examiner*—Matthew T. Henning
(74) *Attorney, Agent, or Firm*—Arent Fox PLLC

(57) ABSTRACT

An encryption processor for encrypting and decrypting data that ensures data security by preventing illegal deciphering or leakage of the data. The encryption processor includes a CPU for running a program, a ROM for storing the program run by the CPU, a RAM used as a work area while the CPU is running the program, an I/O section for sending/receiving data to/from an external device, and an encryption section for decrypting encrypted data and encrypting plain text data.

8 Claims, 9 Drawing Sheets

SECURE ENCRYPTION PROCESSOR WITH TAMPER PROTECTION

BACKGROUND OF THE INVENTION

1. Field of the Invention

The present invention relates to an encryption control apparatus for encrypting and decrypting data.

2. Description of the Related Art

With the recent development of communication techniques, data having the same value as notes, such as electronic money, has been used increasingly, and it becomes quite important to prevent illegal leakage of the data or unauthorized tampering with the data.

As one of the safety measures to protect data, a data encryption and decryption technique has been used, by which data is encrypted when being sent and the receive data is decrypted at the receiver's end. General information processing devices, such as personal computers (hereinafter, abbreviated to PCs occasionally), have been used in encrypting and decrypting data.

Incidentally, attention has been paid to a system that employs an IC card as a typical example of a system capable of dealing with electronic money, etc, and an I/O control unit composed of a plurality of semiconductor devices has been used as an I/O control unit for controlling peripherals, such as an IC card reader/writer that accesses the IC card.

However, when an encryption/decryption computation is carried out by a general information processing device, it is difficult to conceal an encryption/decryption algorithm or a key used in encrypting/decrypting data. Therefore, such an algorithm or a key may be leaked illegally, resulting in unauthorized tampering with the data.

Also, because the conventional I/O control unit for controlling the peripherals, such as the IC card reader/writer, is composed of a plurality of semiconductor devices, progress information of the I/O control job is outputted to an address bus or a data bus interconnecting the semiconductor devices, thereby exposing such information to the risk of stealing.

As has been discussed, the conventional technique poses a problem in data security, and there has been an increasing need to ensure the security.

SUMMARY OF THE INVENTION

It is therefore an object of the present invention to provide an encryption control apparatus with ensured data security.

In order to achieve the above and further objects, an encryption control apparatus of the present invention comprises: a CPU for running a program; a ROM for storing the program run by the CPU; a RAM used as a work area while the CPU is running the program; an I/O section for sending/receiving data to/from an external device; and an encryption section for decrypting encrypted data and encrypting plain text data, and characterized in that each of the foregoing components is formed on a single semiconductor device.

According to the encryption control apparatus of the present invention, because all of the foregoing components are mounted on the single semiconductor device, it is not necessary to output the information on the address bus or data bus to the external, which makes it difficult to discover the encryption/decryption procedure.

It is preferable to arrange the encryption control apparatus in such a manner that:

the RAM stores a private key used in decrypting the encrypted data;

the ROM stores data specifying a party having an authorization to use the encryption control apparatus; and the encryption control apparatus has a standby mode for waiting for data to be received from an external and an enable mode for enabling an operation, and further comprises mode switching means for decrypting encrypted data sent from the external in the standby mode with the private key stored in the RAM so that the plain text data is restored, the switching means also checking whether the plain text data coincides with the data stored in the ROM, and switching the encryption control apparatus to the enable mode or back to the standby mode depending on coincidence and discrepancy of the data.

By checking the coincidence, an unauthorized access can be prevented. Also, because unnecessary components are not operating in the standby mode, waste of power consumption can be reduced.

Also, in the above case, it is preferable that:

the ROM stores a plurality of main programs run in the enable mode; and the encryption control apparatus further comprises main program selecting means for selecting one of the plurality of main programs run in the enable mode based on the data sent from the external in the standby mode.

By storing more than one main program in the ROM, the encryption control apparatus can be used extensively, and by allowing only one of the main programs to run selectively at the start-up from the standby status, the interference of the main programs can be avoided, thereby ensuring data security and job reliability.

It is preferable to arrange the encryption control apparatus of the present invention in such a manner so as to further comprise an authentication section, formed on the single semiconductor device, for sending/receiving data to/from an external information processing device that carries out information processing based on data sent/received to/from the encryption control apparatus, the authentication section also authenticating a data sender party to judge whether the data sender party is an authorized party or not.

When the above authentication section is additionally mounted on the single semiconductor device, the security of the data sent/received to/from the external information processing device can be maintained by authentication. In addition, by including the exclusive-use authentication section, authentication can be carried out at a higher speed than carrying out on the software by the CPU.

Also, it is preferable to arrange the encryption control apparatus of the present invention in such a manner so as to further comprise key generating means for generating a key used in encrypting and decrypting data, so that the encryption control apparatus encrypts and decrypts the data with the key generated by the key generating means. In this case, it is preferable that the key generating means generates a private key and a public key, and sends the public key alone to an external and stores the private key in the RAM.

According to the above arrangement, privacy and safety of the private key can be maintained, thereby making illegal deciphering of the data more difficult.

Also it is preferable to arrange the encryption control apparatus provided with the authentication section in such a manner that:

the RAM stores a private key used in decrypting the encrypted data;

the ROM stores data for specifying a party having an authorization to use the encryption control apparatus; and the encryption control apparatus further comprises I/O section control means for decrypting the encrypted data received in the authentication section with the private key stored in the RAM so that plain text data is restored, the I/O section control means also checking whether the plain text data coincides with the data stored in the ROM, and enabling the I/O section only when coincidence of the data is confirmed.

In this case, it is also preferable to arrange the encryption control apparatus in such a manner that:

the single semiconductor device includes a plurality of the I/O sections mounted thereon; and the I/O section control means enables an I/O section corresponding to the data received by the authentication section based on the authentication data.

Alternatively, the encryption control apparatus may be arranged in such a manner that: the I/O section is allowed to be set to an arbitrary security level among a plurality of security levels; and the I/O section control means sets the I/O section to a security level corresponding to the data received in the authentication section based on the data.

By checking the coincidence, an unauthorized access can be prevented. Also, by enabling the I/O section only when it has to be operated, not only can the security be ensured further, but also the power consumption can be saved. Further, by controlling the security level as described above, an unnecessary access can be prevented, thereby further ensuring the security.

It is also preferable to arrange the encryption control apparatus provided with the authentication section in such a manner that the authentication section sends/receives the data to/from the external information processing device through a modem.

In this case, the operation of the encryption control apparatus can be started from a remote place.

Further, it is preferable to arrange the encryption control apparatus of the present invention in such a manner so as to further comprise data destroying means for, upon receipt of abnormality detection, destroying a key stored in the RAM.

According to the above arrangement, illegal delivery of the key to an intruder can be prevented.

BRIEF DESCRIPTION OF THE ACCOMPANYING DRAWINGS

DETAILED DESCRIPTION OF THE PREFERRED EMBODIMENTS

The following description will describe preferred embodiments of the present invention.

Figure 1:
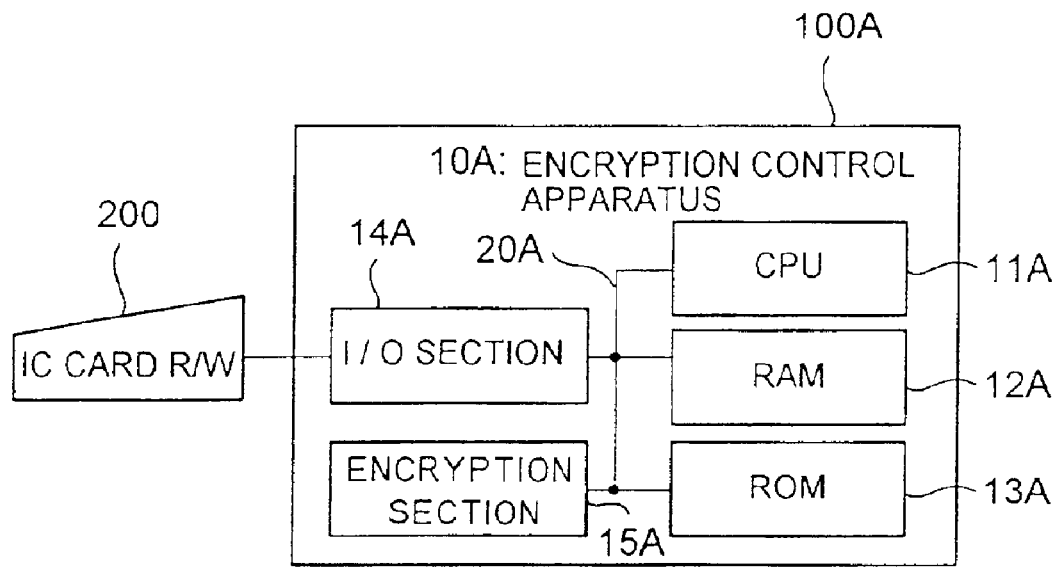
FIG. 1 is a block diagram showing a first embodiment of an encryption control apparatus of the present invention.

FIG. 1 is a block diagram showing a first embodiment of an encryption control apparatus of the present invention.

An encryption control apparatus 10A is formed in a single semiconductor device 100, and comprises a CPU 11A for running the program, a RAM 12A used as a work area while the CPU 11A is running a program, a ROM 13A for storing the program run by the CPU 11A, an I/O section 14A for sending/receiving data to/from an external device (herein, IC card reader/writer (IC card R/W) 200), and an encryption section 15A for decrypting encrypted data and encrypting plain text data. The components forming the encryption control apparatus 10A are interconnected to each other through an internal bus 20A.

The ROM 13A stores an encryption algorithm or a program controlling the I/O section 14A.

Also, data transmitted between the IC card R/W 200 and I/O section 14A includes control data for controlling the IC card R/W 200 and encrypted data read out from the IC card. The data is encrypted by a specific function of the IC card when it is read out from the IC card by the IC card R/W 200, and sent to the encryption control apparatus 10A. The encrypted data sent to the encryption control apparatus 10A is decrypted by the encryption section 15A in the encryption control apparatus 10A. On the other hand, the data generated in the encryption control apparatus 10A is encrypted by the encryption section 15A in the encryption control apparatus 10A when it is sent to the IC card R/W 200 by way of the I/O section 14A, and written into the IC card inserted therein. In the IC card, the encrypted data is decrypted by the specific function of the IC card.

By adopting the above arrangement, none of the data transferred among the encryption section 15A, RAM 12A, and ROM 13A will be leaked to the outside, thereby constructing an encryption control apparatus with high security.

Figure 2:
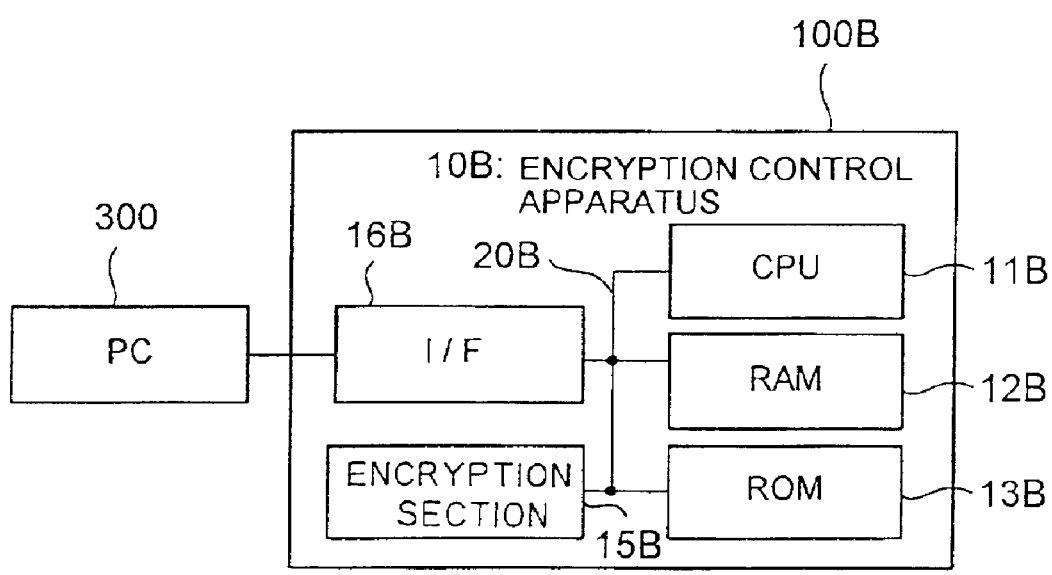
FIG. 2 is a block diagram showing a second embodiment of the encryption control apparatus of the present invention.
Figure 3:
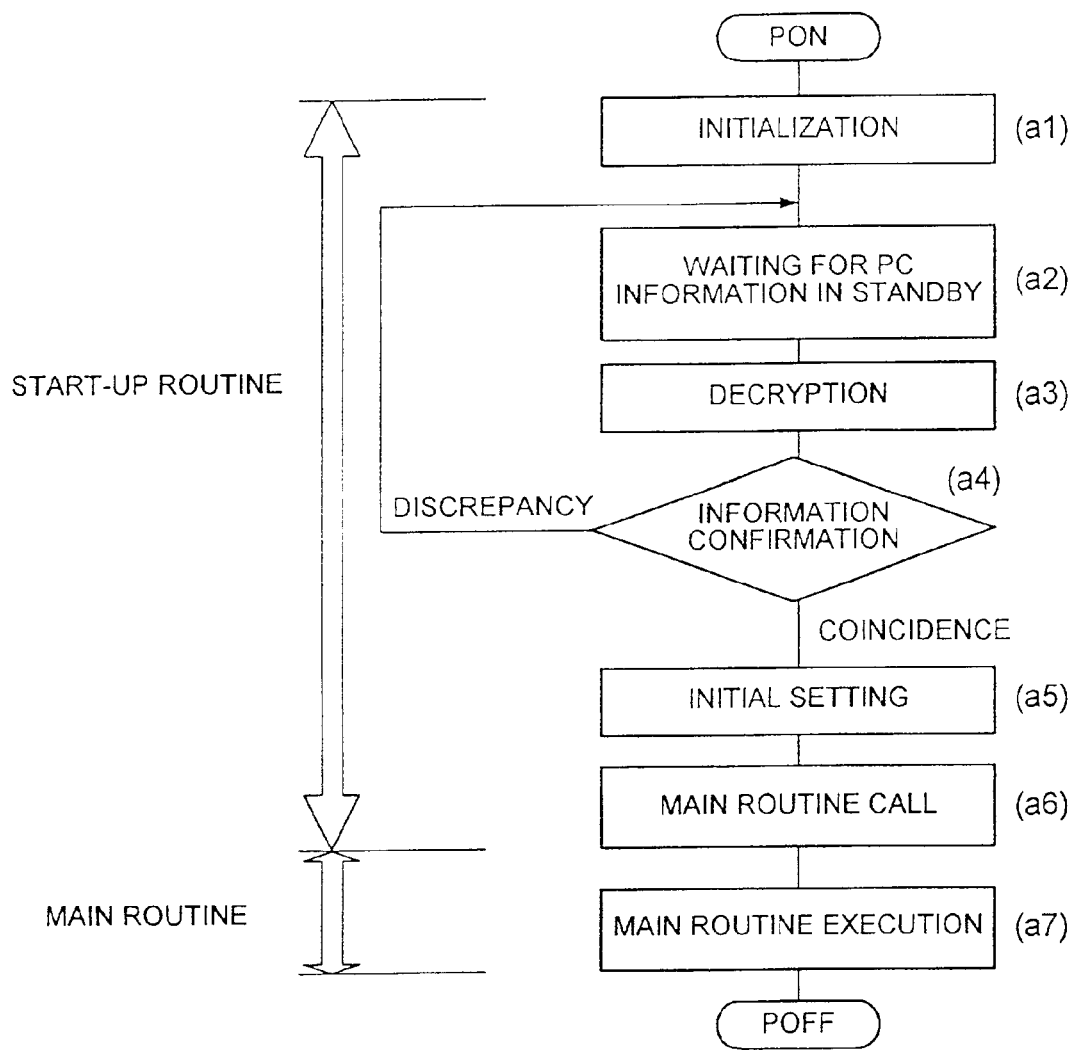
FIG. 3 is a flowchart showing an operation flow of the second embodiment of FIG. 2.

FIG. 2 is a block diagram showing a second embodiment of the encryption control apparatus of the present invention, and FIG. 3 is a flowchart detailing an operation flow of the second embodiment of FIG. 2.

An encryption control apparatus 10B is formed in a single semiconductor device 100B, and comprises a CPU 11B, a RAM 12B, a ROM 13B, an encryption section 15B, and an interface section 16B. Of these components, the CPU 11B, RAM 12B, ROM 13B, and encryption section 15B are the same as their counterparts, namely the CPU 11A, RAM 12A, ROM 13A, and encryption section 15A in the encryption control apparatus 10A of the first embodiment, and the description of these components is not repeated.

The interface section 16B is a component corresponding to the I/O section 14A of the encryption control apparatus 10A of FIG. 1. However, the I/O section 14A of FIG. 1 is suitable to send/receive data to/from the IC card R/W 200, whereas the interface section 16B of FIG. 2 is connected to an ISA bus of a personal computer (PC) 300, and therefore, is suitable to send/receive data to/from the PC 300 through the ISA bus.

The operation flow of FIG. 3 is started at the power ON (PON) when the power source is supplied to the encryption control apparatus 10B. When the start-up routine of FIG. 3 is initiated at the power ON, a minimum of initialization is carried out in the encryption control apparatus 10B (Step a1), and the encryption control apparatus 10B waits for input information from the PC 300 in a standby status (Step a2). In the standby status, no portions but a portion that detects input of the information from the PC 300 alone is operating, thereby saving power consumption.

Because the information sent from the PC 300 is encrypted, upon receipt of the information from the PC 300, a decryption job is carried out (Step a3). The decryption job is carried out by using a private key that has been pre-stored in the RAM 12B. At this stage, the encryption section 15B is disabled, and for this reason, the decryption job is carried out not by the encryption section 15B but on software by a program stored in the ROM 13B.

The input information from the PC 300 during the standby status includes an ID and a password, so that information conformation is carried out as to whether or not the information is sent from a party having an authorization to use the encryption control apparatus 10B (authorized party) by checking if the decrypted information coincides with the information pre-stored in the ROM 13B (Step a4). If the information is judged as not the one sent from the authorized party, the encryption control apparatus 10B returns to Step a2, and switches to the standby status and waits for input information from the PC.

On the other hand, when the information is judged as the one sent from the authorized party, an initial setting job is carried out for each component in the encryption control apparatus 10B (Step a5), and a main routine is called out (Step a6), after which the main routine is executed (Step a7).

As has been described, the encryption control apparatus of the present embodiment stays in the standby status until a call is initiated from the PC, thereby eliminating waste of power consumption.

Figure 4:
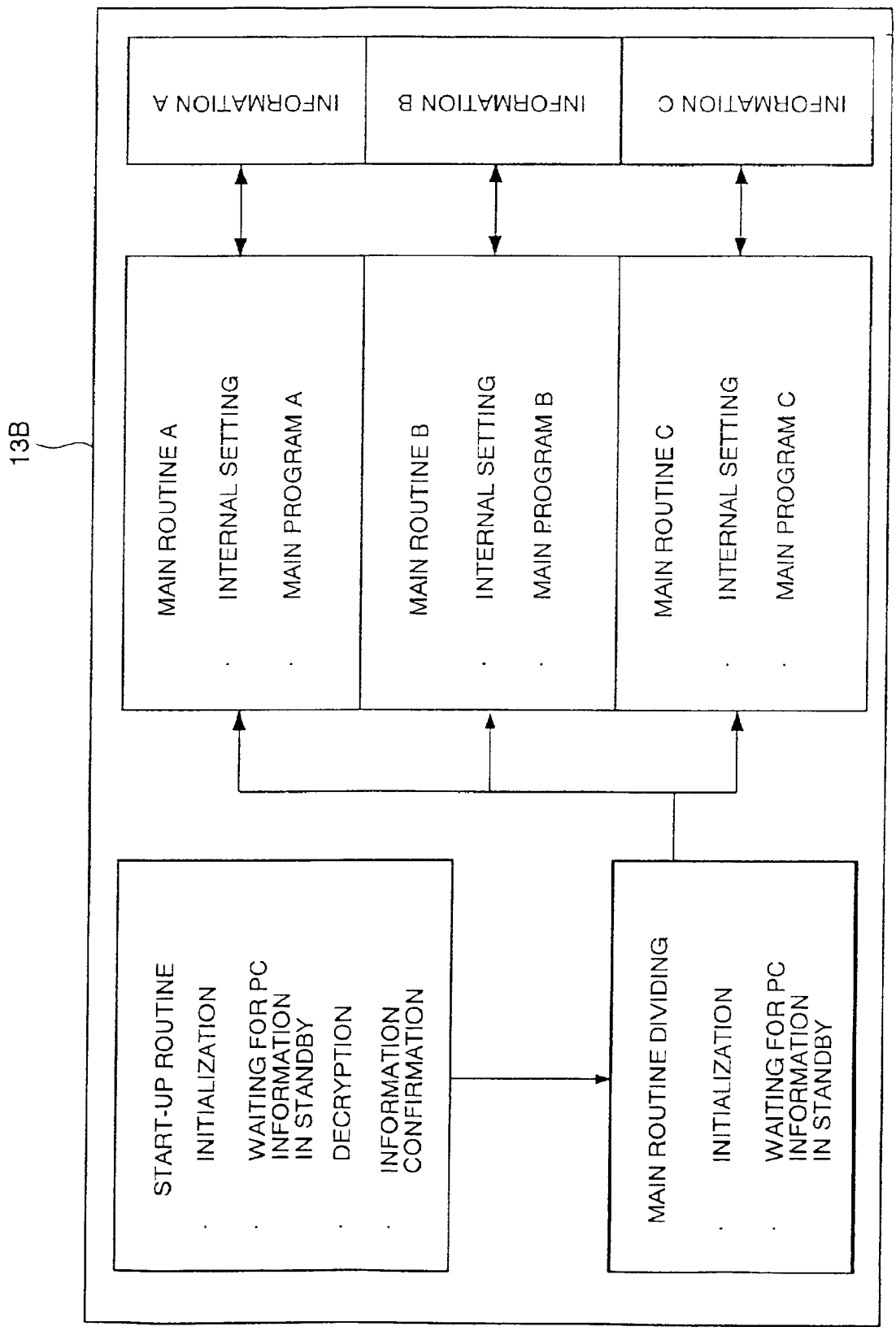
FIG. 4 is a view schematically showing a program structure in a ROM in a third embodiment of the encryption control apparatus of the present invention.

FIG. 4 is a view schematically showing a program structure in the ROM in the third embodiment of the encryption control apparatus of the present invention.

The encryption control apparatus of the third embodiment is of the same structure as shown in FIG. 2. Thus, the drawing for the present embodiment is omitted and the explanation is given with reference to FIG. 2.

A program stored in the ROM 13B includes a start-up routine, a main routine dividing routine, and three main routines A, B, and C. Each of the main routines A, B and C is allowed to refer to their respective information A, B, and C alone. The main routines A, B, and C allow a single encryption control apparatus to operate in different manners by selectively using encryption/decryption control algorithms different from one another.

Figure 5:
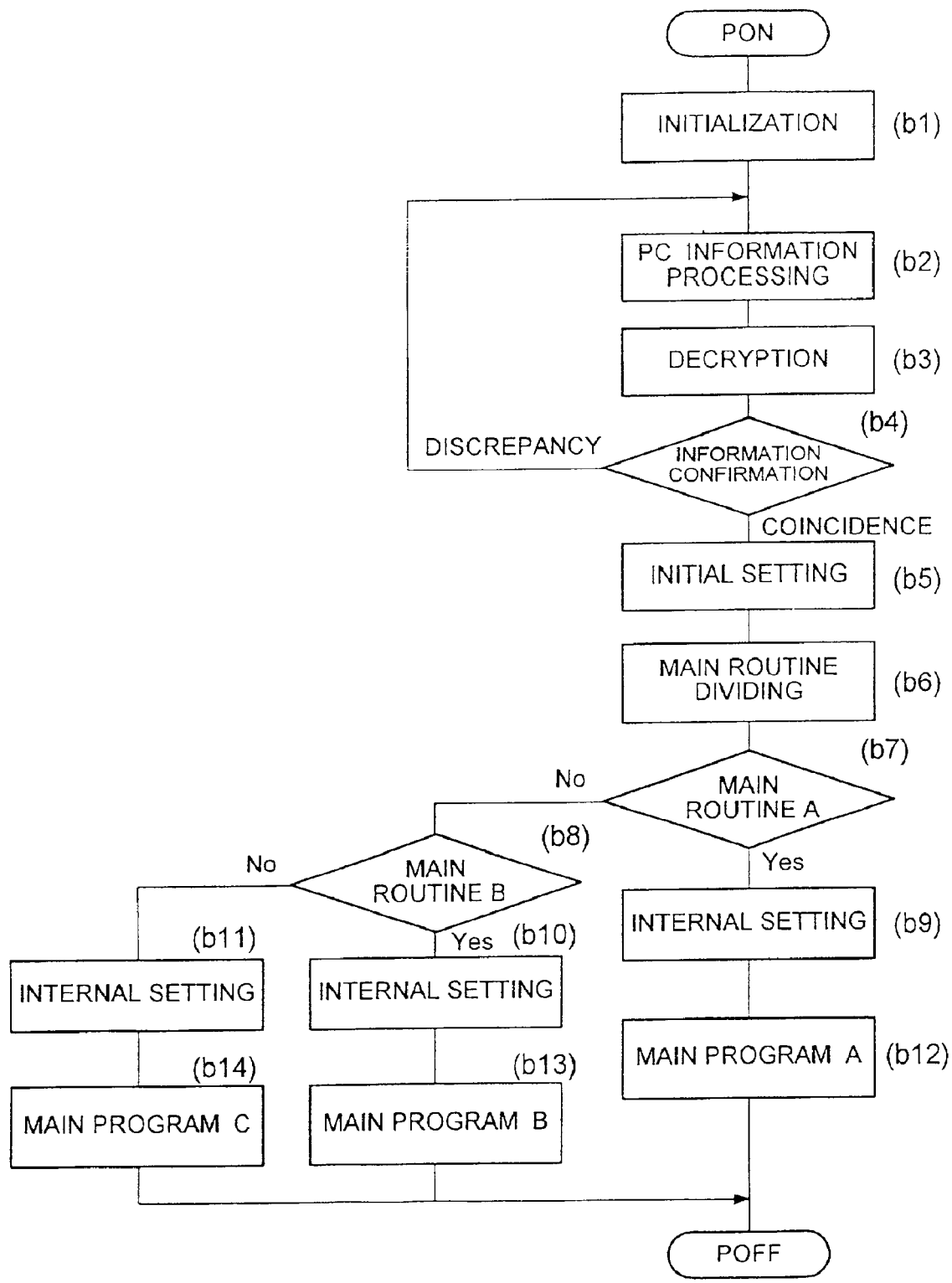
FIG. 5 is a flowchart showing an operation flow of the third embodiment whose program structure is shown in FIG. 4.

FIG. 5 is a flowchart showing an operation flow of the third embodiment whose program structure is shown in FIG. 4.

As is with the operation flow of FIG. 3, the operation flow of FIG. 5 is initiated at the power ON (PON) when the power source is supplied to the encryption control apparatus 10B. Upon the power ON, the start-up routine in the program structure of FIG. 4 is initiated.

Steps b1 to b5 in the operation flow of FIG. 5 are the same as their respective counterparts, namely Steps a1 to a5 in the operation flow of FIG. 3, and the explanation of these steps is omitted.

In Step b6, which of the three main routines A, B and C should be initiated is determined based on the information, which was received in Step b2 and decrypted in Step b3. Then, with respect to the main routine thus determined (Step b7, b8), the internal initial setting is carried out (Step b9, b10 or b11) and the main program is started to run (Step b12, b13, or b14).

As has been discussed, by storing more than one main program in the ROM and allowing only one of the main programs to run selectively at the start-up from the standby status, not only can extensive use of the encryption control apparatus become available, but also the interference of the main programs can be avoided, thereby ensuring data security and job reliability.

Figure 6:
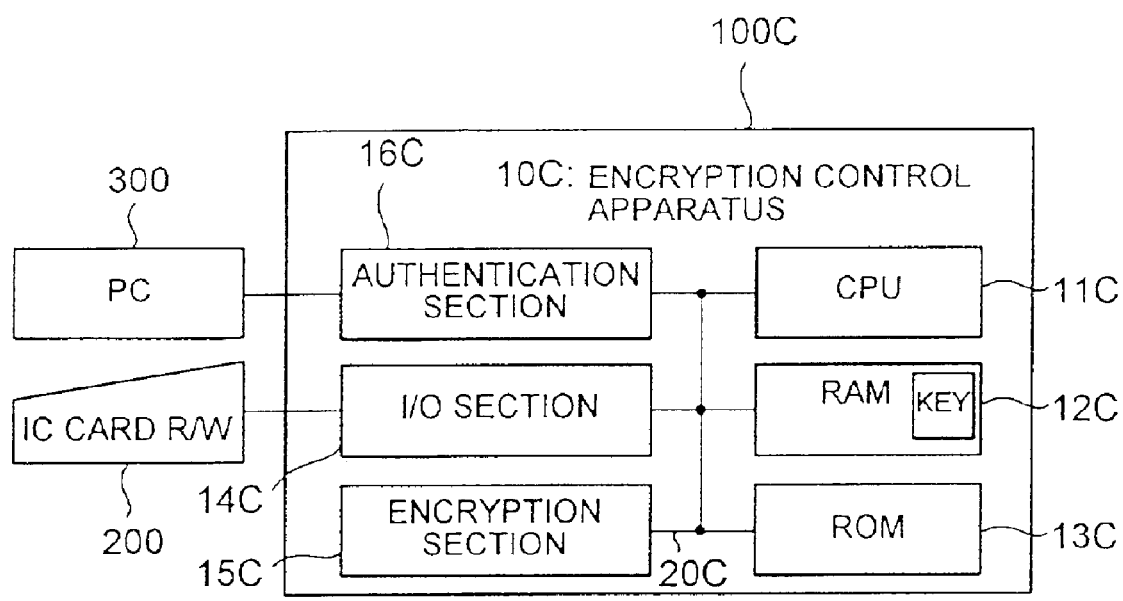
FIG. 6 is a block diagram showing a fourth embodiment of the encryption control apparatus of the present invention.

FIG. 6 is a block diagram showing a fourth embodiment of the encryption control apparatus of the present invention.

An encryption control apparatus 10C is formed in a single semiconductor device 100C, and comprises a CPU 11C, a RAM 12C, a ROM 13C, an I/O section 14C, and an encryption section 15C, which are the same as their respective counterparts in the encryption control apparatus 10A of the first embodiment shown in FIG. 1. Hence, the explanation of these components is omitted. FIG. 6 shows schematically but explicitly that the RAM 12C stores a key.

An authentication unit 16C also forming the encryption control apparatus 10C of FIG. 6 not only serves as an interface connected to the PC 300 to send/receive serial data to/from the PC 300, but also authenticates a data sender to judge whether the data sender is an authorized party or not.

Figure 7:
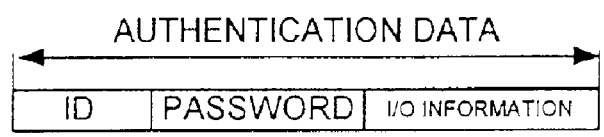
FIG. 7 is a view showing a data structure of authentication data.

FIG. 7 is a view showing a data structure of authentication data sent to the encryption control apparatus 10C from the PC 300.

The authentication data sent from the PC 300 to the encryption control apparatus 10C includes an ID identifying the user of the PC 300, his password, and I/O information that controls the I/O section 14C. The authentication data is encrypted with a public key (a public key 0 shown in FIG. 8, which will be described below), which has been generated by the encryption section 15C in the encryption control apparatus 10C in advance and delivered to the PC 300 by way of the authentication section 16C.

Figure 8:
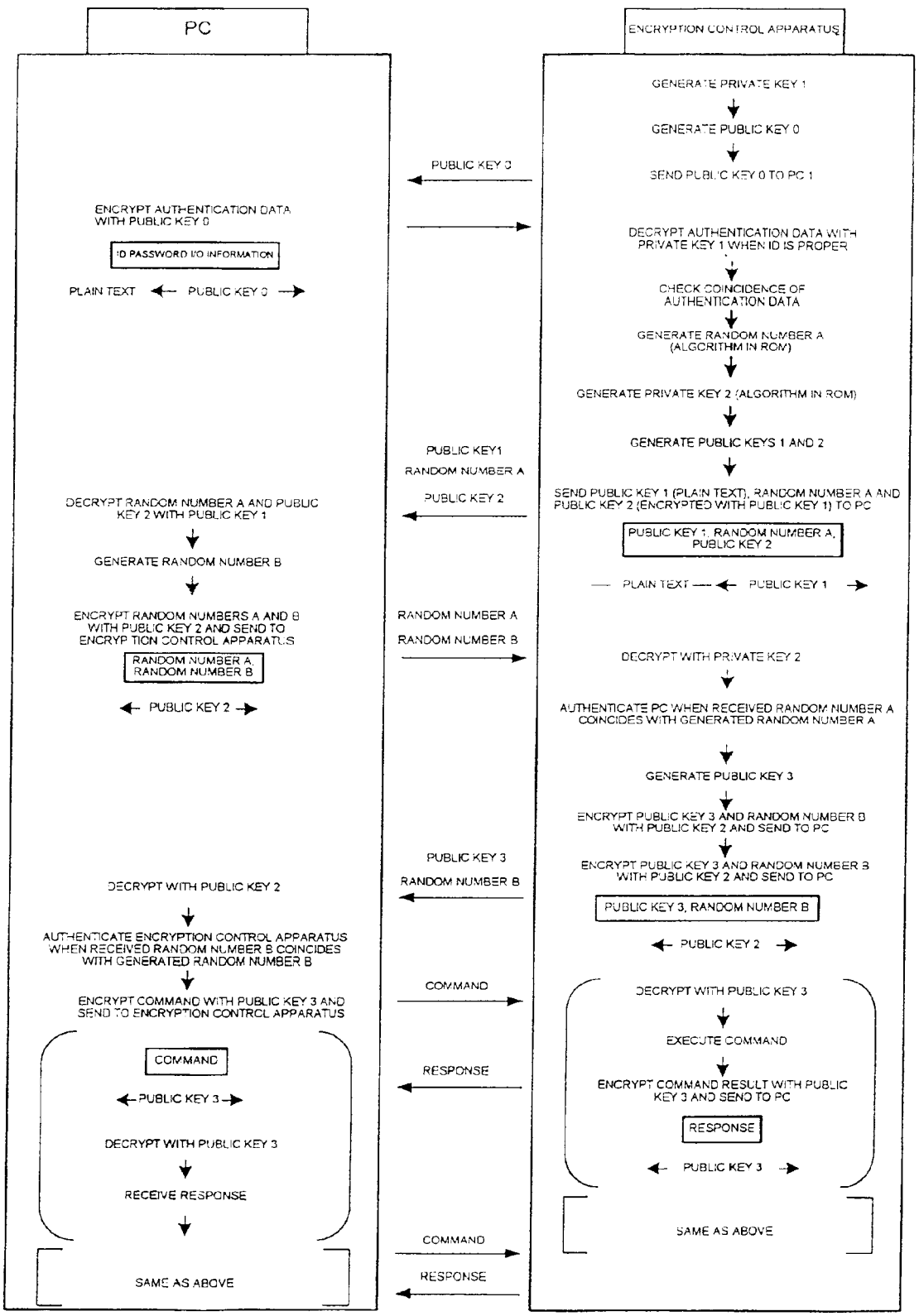
FIG. 8 is a block diagram showing an exemplary authentication procedure between a PC and an encryption control apparatus of the present invention.

FIG. 8 is a view showing the authentication procedure between the PC 300 and encryption control apparatus 10C.

Initially, the encryption control apparatus generates a private key 1 and a public key 0, and delivers the public key 0 alone to the PC. The encryption control apparatus 10C stores the private key in its RAM 12C, so that it is not leaked to the outside by any chance. The data encrypted with the public key 0 can be decrypted with the private key 1 alone.

When the PC sends/receives data to/from the encryption control apparatus, the PC generates authentication data in the data format shown in FIG. 7, encrypts the authentication data with the public key 0 that has been received from the encryption control apparatus in advance, and sends the encrypted authentication data to the encryption control apparatus.

Upon receipt of the encrypted authentication data, the encryption control apparatus decrypts the same with the private key 1 pre-stored in the RAM 12C, so that plain text authentication data is restored. The encryption control apparatus receives the authentication data when it is in the standby status, during which only the necessary and least number of components are operating. For example, the I/O section 14C and decryption section 15C of FIG. 6 are not operating. Accordingly, the authentication data is decrypted on software by a decryption program stored in the ROM 13C.

After decrypting the encrypted authentication data with the private key 1 to the plain text authentication data, the encryption control apparatus checks whether the restored plain text authentication data coincides with the checking authentication data pre-stored in the ROM 13C. When the two kinds of authentication data coincide with each other, the encryption control apparatus proceeds to the next step described below; otherwise, the encryption control apparatus switches back to the standby status and waits for the following data to be received from the PC 300.

When the two kinds of authentication data coincide with each other, a random number A, a private key 2, and two public keys 1 and 2 are generated by an algorithm in the ROM 13C. The random number A and public key 2 are encrypted with the public key 1 by the algorithm in the ROM, and the random number A and public key 2 encrypted with the public key 1 are sent to the PC together with the public key 1. The originally generated private key 2 is stored in the RAM 12C, and the random number A and public key 2 are stored in the RAM 12C as well.

Upon receipt of the public key 1, and the random number A and public key 2 encrypted with the public key 1 from the encryption control apparatus, the PC 300 decrypts the encrypted random number A and public key 2 with the public key 1 so that the plain text random number A and public key 2 are restored, and generates a random number B. Then, the PC 300 encrypts the random number A restored by the decryption with the public key 1 and the new random number B with the public key 2 restored in the above manner, and sends the same to the encryption control apparatus. The random number B is stored also in the PC.

Upon receipt of the encrypted random numbers A and B, the encryption control apparatus decrypts the same with the private key 2 stored in the RAM 12C, so that the random numbers A and B are restored. Then, of these restored random numbers A and B, the random number A is checked whether it coincides with the random number A, which has been generated and stored in the RAM 12C in advance. When the two random numbers A coincide with each other, the encryption control apparatus authenticates the linked PC as an authorized party having an access right to the same. When these random numbers A have a discrepancy, although it is not shown in FIG. 8, the encryption control apparatus notifies the PC of the discrepancy, and switches back to the standby status.

When the random number A that has been received and decrypted by the encryption control apparatus coincides with the random number A stored in the RAM 12C, the encryption control apparatus generates a public key 3, encrypts the random number B that has been sent from the PC 300 and decrypted by the encryption control apparatus and the public key 3 with the public key 2 stored in the RAM 12C, and sends the result to the PC. The public key 3 is also stored in the RAM 12C.

It should be noted that the public key 3 is a key that can decrypt the data encrypted with itself.

Upon receipt of the random number B and public key 3 encrypted with the public key 2, the PC decrypts the received data with the public key 2. Then, of these random number B and public key 3 contained in the decrypted data, the PC checks whether the decrypted random number B coincides with the random number B that the PC has generated and stored therein. When the two random numbers B coincide with each other, the PC authenticates the current communicating party as the encryption control apparatus, to/from which the PC is to send/receive data.

In the foregoing, the decryption and encryption of the data by the encryption control apparatus are carried out on the software by the algorithm in the ROM 13C.

In addition, the encryption control apparatus enables the encryption section 15C only when the linked PC is authenticated as the one having an authorization to access the encryption control apparatus. Consequently, the encryption and decryption hereinafter are carried out by the encryption section 15C at a higher speed than by carrying out the same on the software using the algorithm in the ROM.

Also, when the I/O information in the authentication data shown in FIG. 7 indicates to enable the I/O section 14C, the I/O section 14C is enabled based on the I/O information. On the other hand, when the I/O information indicates that the I/O section 14C does not have to be enabled, the I/O section 14C remains in the disabled status. According to the above arrangement, the power consumption in the I/O section 14C can be saved when the I/O section 14C does not have to be operated, and because the internal portion of the encryption control apparatus is connected to the external communication path less frequently, the security can be further ensured.

When the authentication between the PC and encryption control apparatus is completed in the above manner, the PC issues a command to the encryption control apparatus, and the encryption control apparatus sends a response to that command to the PC. Here, the command sent from the PC to the encryption control apparatus is encrypted with the public key 3, and the encryption control apparatus decrypts the received encrypted command with the public key 3 stored in the RAM 12C by means of the encryption section 15C, whereupon the encryption control apparatus executes the command.

The command result (response) obtained by executing the command is encrypted with the public key 3 by the encryption section 15C in the encryption control apparatus and sent to the PC. Upon receipt of the encrypted response, the PC decrypts the encrypted response, so that the original response is restored.

Hereinafter, the PC and encryption control apparatus communicates with each other in the similar manner as necessary.

As has been discussed, the encryption control apparatus is provided with key generating means, so that the encryption control apparatus encrypts or decrypts the data with a key generated by itself while strictly keeping the private key inside. Also, when the current communicating party is not authenticated as an authorized party, the encryption control apparatus switches to the standby status and stops operating. Moreover, the substantial data is transmitted only when the current communicating party is authenticated as an authorized party. According to the above arrangements, the privacy and safety of the data can be maintained, and illegal deciphering of the data is almost impossible.

Figure 9:
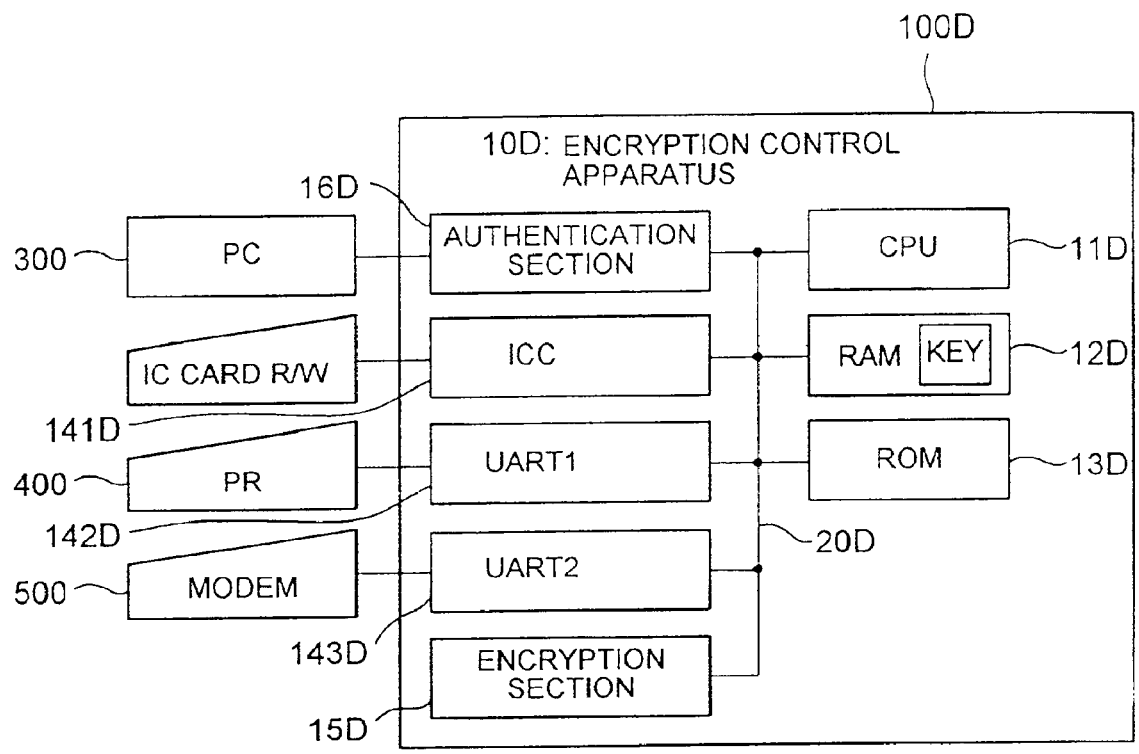
FIG. 9 is a block diagram showing a fifth embodiment of the encryption control apparatus of the present invention.

FIG. 9 is a block diagram showing a fifth embodiment of the encryption control apparatus of the present invention. Here, only the difference from the counterpart of the fourth embodiment shown in FIG. 6 will be explained.

The encryption control apparatus of the fifth embodiment of FIG. 9 is provided with three I/O sections 141D, 142D, and 143D (ICC, UART1, and UART2 ) that correspond to the I/O section 14C in the encryption control apparatus of the fourth embodiment shown in FIG. 6. Besides the three I/O sections 141D, 142D, and 143D, each component forming the encryption control apparatus 10D is mounted on a single semiconductor device 100D. The I/O sections 141D, 142D, and 143D are connected to the IC card R/W 200, a printer (PR) 400, and a remote controller modem (MODEM) 300, respectively.

Figure 10:
FIG. 10 is a view showing a data structure of authentication data.

FIG. 10 is a view showing a data structure of authentication data sent to the encryption control apparatus of the fifth embodiment shown in FIG. 9.

Different from the authentication data shown in FIG. 7, the authentication data shown in FIG. 10 additionally includes command information.

The command information indicates either (1) a command (Open) to enable one of the three I/O sections 141D, 142D, and 143D specified by the I/O information, (2) a command (Close) to disable the specified enabled I/O section, or (3) a command (Change) to enable the I/O section specified by the I/O information and, if any of the other I/O sections is enabled, disable that enabled I/O section. The PC encrypts the authentication data and sends the same to the encryption control apparatus, and the encryption control apparatus decrypts the received data, so that the plain text authentication data is restored. Upon completion of the authentication explained with reference to FIG. 8, the encryption control apparatus controls the three I/O sections 141D, 142D, and 143D shown in FIG. 9 in accordance with the command information and I/O information contained in the authentication data.

According to the above arrangement, the I/O sections other than the I/O section necessary for running the current job are kept disabled. Consequently, the power consumption can be saved, and the risk that the data outputted from the I/O section is illegally deciphered can be reduced.

Further, each of the three I/O sections 141D, 142D, and 143D shown in FIG. 9 can change its security level within several levels including the disable status (no access right). Accordingly, the command information can include a LevelUp1 command for changing the security level from "0" to "1", a LevelUp2 command for changing the security level from "1" to "2", a LevelUp3 command for changing the security level from "2" to "3", and a LevelDn command for lowering the current security level by one.

Figure 11:
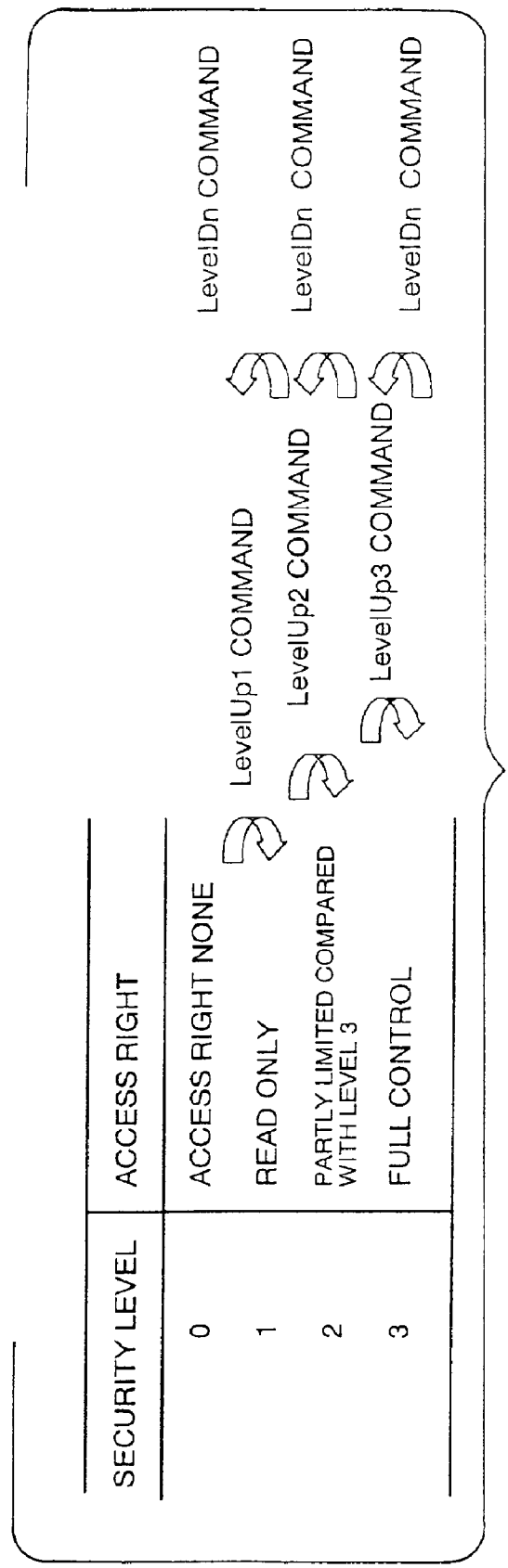
FIG. 11 is a view showing a correspondence of a range of an access right in each security level to each command.

FIG. 11 is a view showing a correspondence of a range of an access right in each security level to each command. Also, Table 1 shows a function of each command in each security level.

TABLE 1

| Security | LevelUp1 Command | LevelUp2 Command | LevelUp3 Command | LevelDn Command |
|---|---|---|---|---|
| Security Level 0 | to Security level 1 | Error | Error | Error |
| Security Level 1 | NOP | To Security level 2 | Error | to Security level 0 |
| Security Level 2 | Error | NOP | to Security level 3 | to Security level 1 |
| Security Level 3 | Error | Error | NOP | to Security level 2 |

As has been discussed, by providing more than one security level, an unnecessary access can be prevented, thereby further ensuring the security.

In the encryption control apparatus of the fifth embodiment shown in FIG. 9, the authentication section 16D is used as a connection portion to the PC 300, but it can be included inside the I/O section 143D that controls the modem 500. In the latter case, by connecting the PC or the like to the modem 500, the operation of the encryption control apparatus can be controlled remotely.

Figure 12:
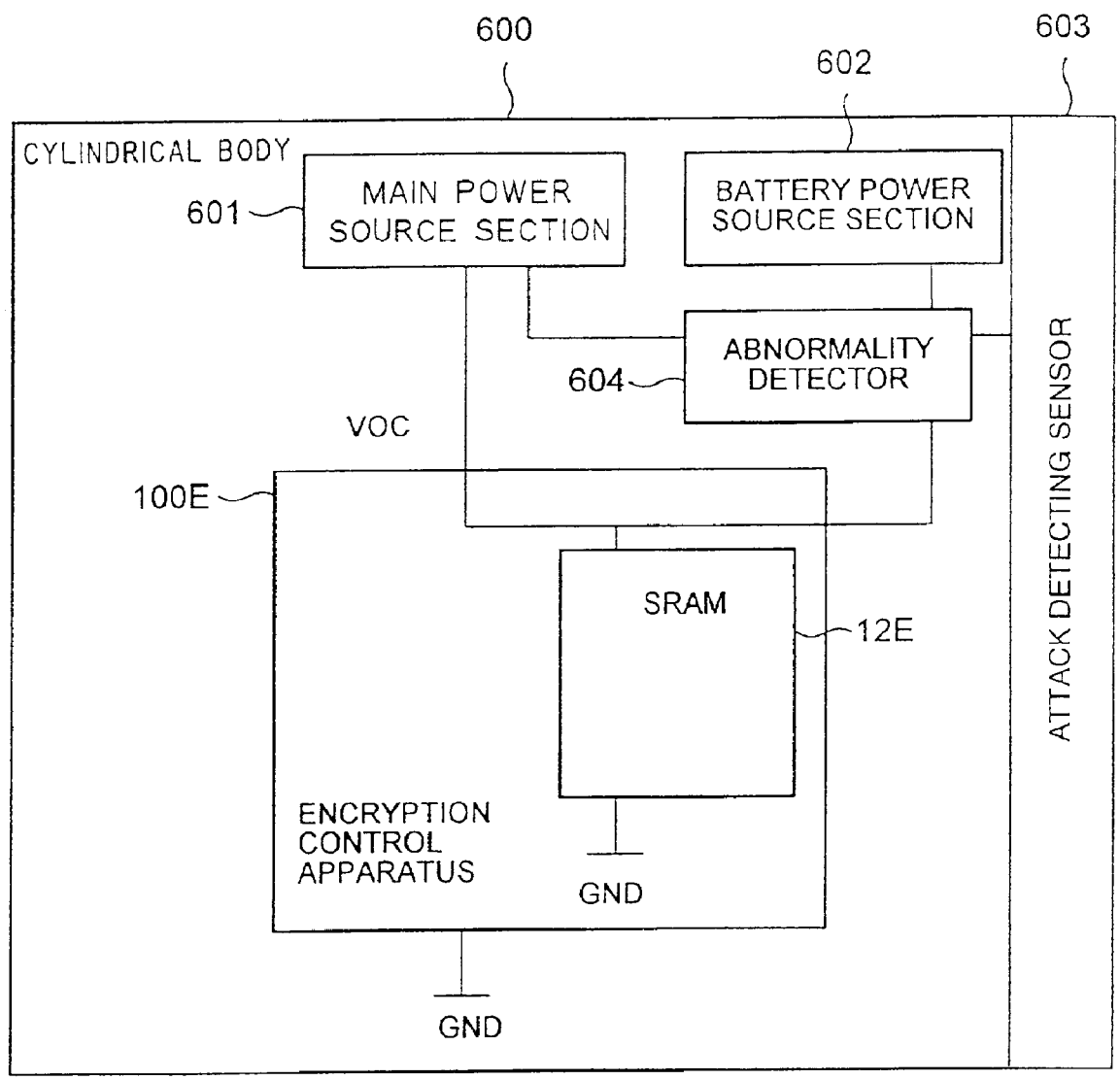
FIG. 12 is a view schematically showing a sixth embodiment of the encryption control apparatus of the present invention.

FIG. 12 is a view schematically showing a sixth embodiment of the encryption control apparatus of the present invention.

An encryption control apparatus 10E of FIG. 12 only shows a SRAM 12E. The SRAM 12E serves as the RAM 12D of FIG. 9, and although it is not shown in FIG. 12, the encryption control apparatus of FIG. 12 comprises the same components as those shown in FIG. 9, and all of these components are mounted on a single LSI chip 100E.

FIG. 12 shows a cylindrical body 600 of an apparatus incorporating the encryption control apparatus 10E mounted on the LSI chip 100E. The cylindrical body 600 includes inside a main power source section 601 for supplying power from a commercial power source to the SRAM 12E of the encryption control apparatus 10E, a battery power source section 602 for supplying power accumulated in the battery to the SRAM 12E, an attack detecting sensor 603 for detecting disassembly or break-up of the cylindrical body 600, and an abnormality detector 604 for receiving a signal from the attack detecting sensor 603 and detecting disassembly or break-up when the cylindrical body 600 is forced to be opened. It should be appreciated that power is also supplied to the components of the encryption control apparatus 10E other than the SRAM 12E. However, attention is focused on the SRAM 12E herein, and the other components and a power supply path to these components or the like are omitted in the drawing.

Here, when the abnormality detector 604 detects abnormality, such as disassembly or break-up of the cylindrical body 600, from the signal sent from the attack detecting sensor 603, the abnormality detector 604 notifies the main power source section 601 of the abnormality, whereupon the main power source section 601 forcibly cuts the power supply to the encryption control apparatus 10E including the SRAM 12E. Also, the abnormality detector 604 cuts the power supply from the battery power source section 602 to the encryption control apparatus 10E. As has been described, the key is stored in the SRAM 12E, but when the power supply is cut in the above manner, the key and other data stored in the SRAM 12E are all destroyed. Thus, if someone tries to steal the key or other data illegally by unauthorized disassembly or break-up, he certainly fails in doing so, and therefore, illegal leakage of the data can be prevented.

An example of destroying the key or other data by cutting the power supply has been explained. However, the key or data may be destroyed by the following manner. That is, a signal from the attack detecting sensor 603 or the detection result of the abnormality detector 604 is inputted to the encryption control apparatus 10E as an interruption signal, and the encryption control apparatus overwrites useless data on the SRAM 12E upon receipt of the interruption signal, thereby destroying the key or data on the software.

What is claimed is:

1. An encryption control apparatus, comprising:
   a CPU for running a program;
   a ROM for storing the program run by the CPU;
   a RAM used as a work area while the CPU is running the program;
   an I/O section for sending/receiving data to/from an external device; and an encryption section for decrypting encrypted data and encrypting plain text data, wherein each of the foregoing components is formed on a single semiconductor device, wherein the RAM stores a private key and a public key used in decrypting the encrypted data, the ROM stores data specifying a party having an authorization to use the encryption control apparatus, and wherein the encryption control apparatus has a standby mode for waiting for data to be received from an external device and an enable mode for enabling an operation, and further comprises mode switching means for decrypting encrypted data sent from the external device in the standby mode with the private key stored in the RAM so that the plain text data is restored, the switching means also checking whether the plain text data coincides with the data stored in the ROM, and switching the encryption control apparatus to the enable mode or back to the standby mode depending on coincidence and discrepancy of the data, wherein the encryption control apparatus further comprises a key generating means for generating the private key and the public key, and wherein the encryption control apparatus delivers the public key alone to the external device, and wherein the external device receives the public key from the encryption control apparatus to encrypt the data sent to the encryption control apparatus.

2. The encryption control apparatus according to claim 1, wherein:

the ROM stores a plurality of main programs run in the enable mode; and the encryption control apparatus further comprises main program selecting means for selecting one of the plurality of main programs run in the enable mode based on the data sent from the external device in the standby mode.

3. The encryption control apparatus according to claim 1, further comprising an authentication section, formed on the single semiconductor device, for sending/receiving data to/from an external information processing device that carries out information processing based on data sent/received to/from the encryption control apparatus, the authentication section also authenticating a data sender party to judge whether the data sender party is an authorized party.

4. The encryption control apparatus according to claim 3, wherein:

the RAM stores a private key used in decrypting the encrypted data;

the ROM stores data for specifying a party having an authorization to use the encryption control apparatus; and the encryption control apparatus further comprises I/O section control means for decrypting the encrypted data received in the authentication section with the private key stored in the RAM so that plain text data is restored, the I/O section control means also checking whether the plain text data coincides with the data stored in the ROM, and enabling the I/O section only when coincidence of the data is confirmed.

5. The encryption control apparatus according to claim 4, wherein:

the single semiconductor device includes a plurality of the I/O sections mounted thereon; and the I/O section control means enables an I/O section corresponding to the data received by the authentication section based on the authentication data.

6. The encryption control apparatus according to claim 4, wherein:

the I/O section is allowed to be set to an arbitrary security level among a plurality of security levels; and the I/O section control means sets the I/O section to a security level corresponding to the data received in the authentication section based on the data.

7. The encryption control apparatus according to claim 3, wherein the authentication section sends/receives the data to/from the external information processing device through a modem.

8. The encryption control apparatus according to claim 1, further comprising data destroying means, which upon receipt of abnormality detection, destroys a key stored in the RAM.

* * * * *